(12) United States Patent  
Unser et al.

(10) Patent No.: US 9,390,429 B2  
(45) Date of Patent: Jul. 12, 2016

(54) SYSTEM AND METHOD FOR MAKING WEATHER BASED ACTIVITY RECOMMENDATIONS

(71) Applicant: MASTERCARD INTERNATIONAL INCORPORATED, Purchase, NY (US)

(72) Inventors: Kenny Unser, Fairfield, CT (US); Serge Bernard, Danbury, CT (US); Nikhil A. Malgatti, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/276,626

(22) Filed: May 13, 2014

(65) Prior Publication Data

US 2015/0332285 A1    Nov. 19, 2015

(51) Int. Cl.  
*G06F 19/00* (2011.01)  
*G06Q 30/02* (2012.01)

(52) U.S. Cl.  
CPC ........ *G06Q 30/0201* (2013.01); *G06Q 30/0252* (2013.01); *G06Q 30/0269* (2013.01)

(58) Field of Classification Search  
CPC ..... G06Q 20/1085; G06Q 20/12; G06F 17/40  
USPC ......................................... 235/379, 380, 385  
See application file for complete search history.

(56) References Cited

U.S. PATENT DOCUMENTS

2011/0093326 A1*  4/2011  Bous et al. ................. 705/14.38  
2015/0169692 A1*  6/2015  Klingen ....................... 235/383

* cited by examiner

*Primary Examiner* — Daniel St Cyr  
(74) *Attorney, Agent, or Firm* — Howard IP Law Group

(57) ABSTRACT

A system for correlating customer payment card purchases and contemporaneous weather conditions. The system comprises a first data storage device containing payment card transaction data and a second data storage device comprising historic weather data. A processor is provided and configured to identify correlations between payment card transactions and weather conditions contemporaneous to the transactions or otherwise associated therewith.

11 Claims, 6 Drawing Sheets

SYSTEM AND METHOD FOR MAKING WEATHER BASED ACTIVITY RECOMMENDATIONS

CROSS-REFERENCE TO RELATED APPLICATIONS

None.

FIELD OF INVENTION

The present invention relates to financial transaction data and systems and methods for using such data. More particularly, the invention relates to systems and methods for integrating and analyzing localized weather data with localized transaction data to predict the types of purchases or activities a cardholder may seek out under particular weather conditions.

BACKGROUND

Merchants and entertainment/activity providers (e.g. restaurants, movie theaters, theme parks, museums, and the like) solicit business through various means in order to attempt to influence customers' purchasing decisions. Such means include but are not limited to direct targeting of consumers, indirect advertisements and discount offers, promotional strategies such as direct mail, telemarketing, direct response television advertising and online selling. However, it is often challenging for merchants and activity providers to accurately target customers with inherent interests in their products or services, and/or to determine advantageous times for these solicitations. For example, it may be difficult to determine when a given customer or group of customers may be interested in engaging in a particular activity, and therefore difficult to determine when it may be best to reach out to the customer for providing a recommendation.

Alternative systems and methods for targeting customers for goods and services are desired.

SUMMARY

In embodiments, systems and computer-implemented methods provide for the correlation of customer payment card purchases and contemporaneous weather conditions. In one embodiment, a system comprises one or more data storage devices containing payment card transaction data of a plurality of customers, the payment card transaction data including at least customer information, geographical information and information identifying a category of good or service associated with the transaction. One or more data storage devices containing historic weather data is also provided. A processor in communication with a memory device is configured to identify correlations between payment card transactions and weather conditions contemporaneous to the transactions or otherwise associated therewith. The processor is further configured to store identified correlations according to at least one profile characteristic, such as customer information, identification or geographical information.

In another embodiment, a computer-implemented method for identifying correlations between customer payment card purchases and weather conditions is provided. The method includes the steps of generating a database identifying payment card transactions based on processing payment card transaction data of a plurality customers and merchants. This payment card transaction data may include at least customer information, geographical information and information identifying a category of good or service associated with the transaction. A database comprising historical weather data corresponding to the time and location of the identified payment card transactions is also generated. A processor is configured to identify or determine correlations between payment card transactions and weather conditions contemporaneous to said transactions, and to store these identified correlations according to at least one profile category (e.g. customer identity, geographical considerations, etc.).

In yet another embodiment of the present disclosure, a system for generating targeted advertisements for leisure expenditures according to current or forecasted weather is provided. The system includes one or more data storage devices containing payment card transaction data of a plurality of customers. The payment card transaction data may include at least customer information, geographical information and information identifying a category of good or service associated with the transaction. Sources of historical and current or forecasted weather data are also provided, or are otherwise accessible by the system. One or more processors are configured to identify payment card transactions relating to leisure expenditures, and identify correlations between the identified payment card transactions related to leisure expenditures and weather conditions contemporaneous to said transactions for storage on a memory device. The one or more processors may also be configured to identify a predicted or potential future leisure expenditure based on current or forecasted weather conditions for one or more profile categories (e.g. specific customers, customers of a certain geographic region, etc.), and to generate an advertisement for said predicted leisure expenditure.

DETAILED DESCRIPTION

Figure 1:
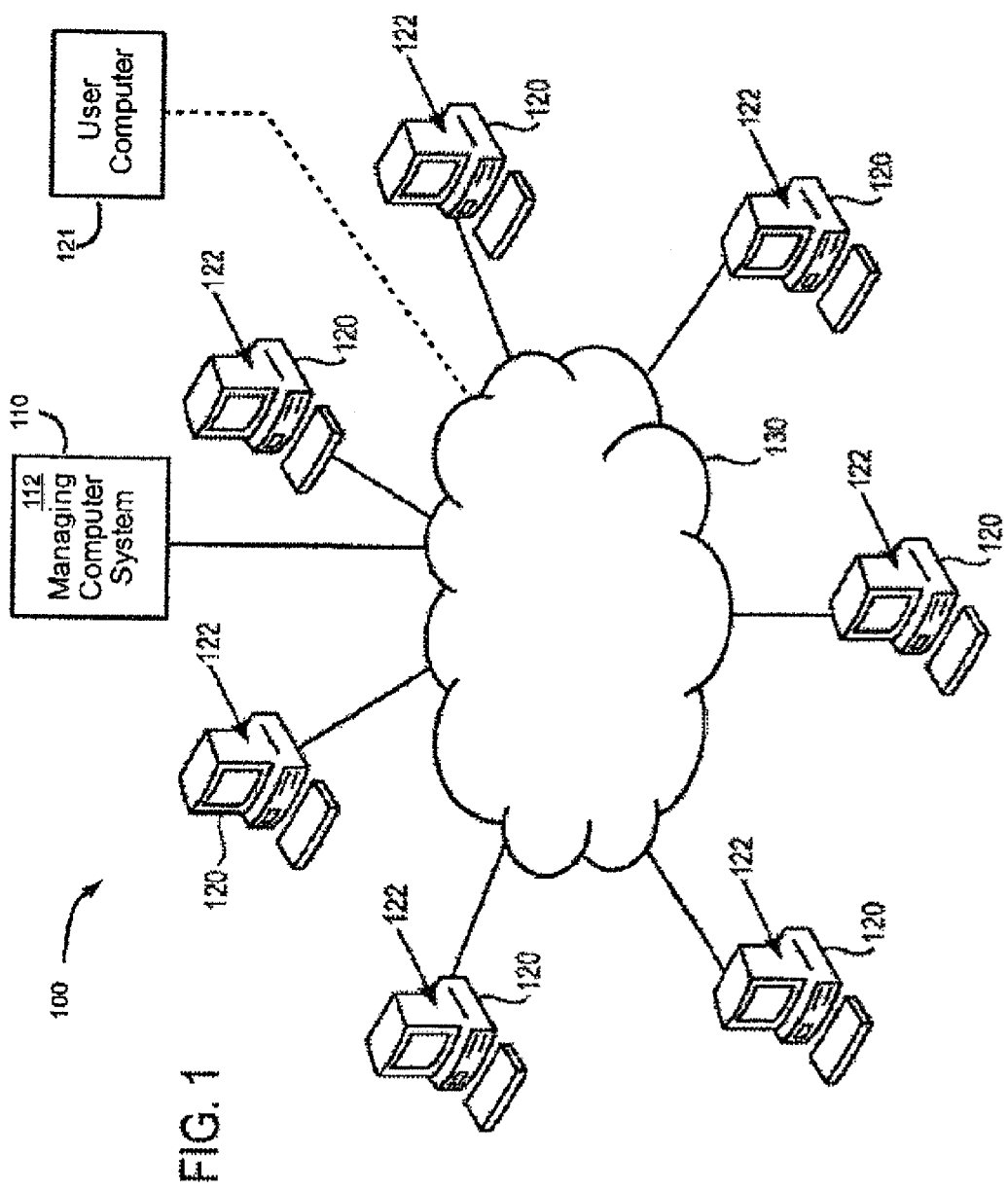
FIG. 1 illustrates a system architecture within which some embodiments of the present disclosure may be implemented.

Disclosed herein are processor-executable methods, computing systems, and related processing for the generation, administration, management and communication of data relating to correlations between consumer spending behavior in, for example, the areas of leisure and activities, and contemporaneous weather conditions. Transaction data comprising a multiplicity of payment card transaction records that include customer information, merchant information, and transaction amounts are processed to identify purchasing trends with a correlation to weather conditions. Transaction data may be stored in a data base and analyzed in conjunction with historic weather data to link relevant fields within various records to one another in order to determine and establish relationships, correlations (e.g. cause and effect, associations and groupings) and other links between and among categories of goods, services, activities, customers, merchants, geographic regions, frequency, and the like.

While embodiments of the present disclosure will generally be described herein in the context of identifying leisure-related activities which may correlate to contemporaneous weather conditions, it should be understood that similar systems and methods may be implemented to identify purchasing trends associated with any other types of goods or services not related to leisure activities that display a correlation to particular weather events or weather conditions, without departing from the scope of the present disclosure.

A "payment card processing system" or "credit card processing network" or "card network", such as the MasterCard network exists, allowing consumers to use payment cards issued by a variety of issuers to shop at a variety of merchants. With this type of payment card, a card issuer or attribute provider, such as a bank, extends credit to a customer to purchase products or services. When a customer makes a purchase from an approved merchant, the card number and amount of the purchase, along with other relevant information, are transmitted via the processing network to a processing center, which verifies that the card has not been reported lost or stolen and that the card's credit limit has not been exceeded. In some cases, the customer's signature is also verified, a personal identification number is required or other user authentication mechanisms are imposed. The customer is required to repay the bank for the purchases, generally on a monthly basis. Typically, the customer incurs a finance charge for instance, if the bank is not fully repaid by the due date. The card issuer or attribute provider may also charge an annual fee.

A "business classification" is a group of merchants and/or businesses, classified by the type of goods and/or service the merchant and/or business provides. For example, the group of merchants and/or businesses can include merchants and/or businesses which provide similar goods and/or services. In addition, the merchants and/or businesses can be classified based on geographical location, sales, and any other type of classification, which can be used to define a merchant and/or business with similar goods, services, locations, economic and/or business sector, industry and/or industry group.

Determination of a merchant classification or category may be implemented using one or more indicia or merchant classification codes to identify or classify a business by the type of goods or services it provides. For example, ISO Standard Industrial Classification ("SIC") codes may be represented as four digit numerical codes assigned by the U.S. government to business establishments to identify the primary business of the establishment. Similarly a "Merchant Category Code" or "MCC" is also a four-digit number assigned to a business by an entity that issues payment cards or by payment card transaction processors at the time the merchant is set up to accept a particular payment card. Such classification codes may be included in the payment card transactions records. The merchant category code or MCC may be used to classify the business by the type of goods or services it provides. For example, in the United States, the merchant category code can be used to determine if a payment needs to be reported to the IRS for tax purposes. In addition, merchant classification codes are used by card issuers to categorize, track or restrict certain types of purchases. Other codes may also be used including other publicly known codes or proprietary codes developed by a card issuer, such as NAICS or other industry codes, by way of non-limiting example.

As used herein, the term "processor" broadly refers to and is not limited to a single- or multi-core general purpose processor, a special purpose processor, a conventional processor, a Graphics Processing Unit (CPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (Sac), and/or a state machine.

It is to be understood that a payment card is a card that can be presented by the cardholder (i.e., customer) to make a payment. By way of example, and without limiting the generality of the foregoing, a payment card can be a credit card, debit card, charge card, stored-value card, or prepaid card or nearly any other type of financial transaction card. It is noted that as used herein, the term "customer", "cardholder," "card user," and/or "card recipient" can be used interchangeably and can include any user who holds a payment card for making purchases of goods and/or services. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction acquirer" can include, for example, a merchant, a merchant terminal, an automated teller machine (ATM), or any other suitable institution or device configured to initiate a financial transaction per the request of the customer or cardholder.

As set forth above, embodiments of the present disclosure relate to systems and methods for integrating and associating localized weather data with payment card transaction data to generate correlations between the types of activities, goods, or services a cardholder may seek out and weather conditions at, or proximately at, the time of the transaction of activity. A method according to embodiments of the present disclosure includes two primary steps. First, determinations or identifications of activities that illustrate an apparent correlation with weather or a change in weather are made. In one embodiment, this may be achieved through various statistical methods for identifying deviations in normal transactions that can be associated or correlated with a change in weather, or a particular weather condition. For example, in hot weather, the number of visitors to water parks may generally increase within a given geographical area relative to the numbers of visitors on relatively cooler days. Likewise, on cold and/or rainy days, local movie theater sales may show an increase. In one embodiment, correlations may be sought out according to an identified geographical area (e.g. city/state/country/etc.). In this way, correlation analysis may utilize in-market data to determine the kinds of activities individuals tend to undertake in certain geographical areas during specific weather conditions. Likewise, any number of other cardholder or transaction characteristics (herein described as "profile categories") may be correlated with weather conditions beyond simply geographical considerations. It should be understood that these tendencies can be used to generate weather-specific behavioral profiles for individual cardholders, or weather-specific behavioral profiles for groups of cardholders or non-cardholders known to share certain characteristics with cardholders (e.g. reside in the same geographic region, etc.).

A second step of the method includes utilizing identified correlations between, for example, weather, geography and activities, to provide activity (or product) recommendations (e.g. in the form of targeted advertisements and the like), to cardholders or individuals meeting some or all of the characteristics of the correlation. For example, cardholders residing in a particular geographic area currently experiencing, or forecasted to experience, a certain weather condition may be targeted with recommendations for activities previously shown to be correlated with specific cardholders, or cardholders or non-cardholders who may reside or be present in the same area during similar weather conditions.

In one exemplary embodiment, an analytics engine utilizes statistical analyses and techniques applied to payment card transaction data in order analyze the payment card transactions records to determine relationships, patterns, and trends between and among the various transaction records and historical weather data imported from a predetermined source, such as the National Weather Service, U.S. Oceanographic Service, or other suitable, reliable historic weather provider or combinations thereof. As described above, this analysis may be used to predict future transactions, or consumer tendencies, according to predicted or current weather conditions.

Such statistical analyses may be targeted to particular subsets of the transactions data, including by way of non-limiting example, one or more particular geographic regions, business categories, customer categories, product or service types, and purchasing frequencies. The transaction records may be processed and segmented into various categories in order to determine purchasers of a given activity, good or service, purchasing frequencies, and drivers or factors affecting purchases, by way of non-limiting example. The analytics engine may utilize independent variables as well as dependent variables representative of one or more purchasing events, customer types or profiles, merchant types or profiles, purchase amounts, and purchasing frequencies, by way of example only. The analytics engine may use models such as regression analysis, correlation, analysis of variances, time series analysis, determination of frequency distributions, segmentation and clustering applied to the transactions data in order to determine and predict the effect particular categories of data have on other categories.

Referring now to FIG. 1, there is shown a high-level diagram illustrating an exemplary system for identifying behavioral trends (e.g. activity or purchasing trends) using transaction and weather data according to an embodiment of the disclosure. As shown in FIG. 1, the system 100 includes a managing computer system 110 that includes a data storage device or data warehouse for storing payment card transaction records associated with a card network provider, or payment card service provider 112. Each payment transaction performed by a transaction acquirer and/or merchant 122 having a corresponding merchant computer system 120 is transferred to the managing computer system 110 via a network 130 which connects the computer system 120 of the transaction acquirer or merchant 122 with the managing computer system 110 of the payment card service provider 112. Transactions performed between a customer or cardholder and a transaction acquirer or merchant 122 may comprise point of sale transactions, or electronic point of sale transactions performed via a customer or cardholder computer 121.

The network 130 can be virtually any form or mixture of networks consistent with embodiments as described herein include, but are not limited to, telecommunication or telephone lines, the Internet, an intranet, a local area network (LAN), a wide area network (WAN), virtual private network (VPN) and/or a wireless connection using radio frequency (RF) and/or infrared (IR) transmission to name a few.

Figure 2:
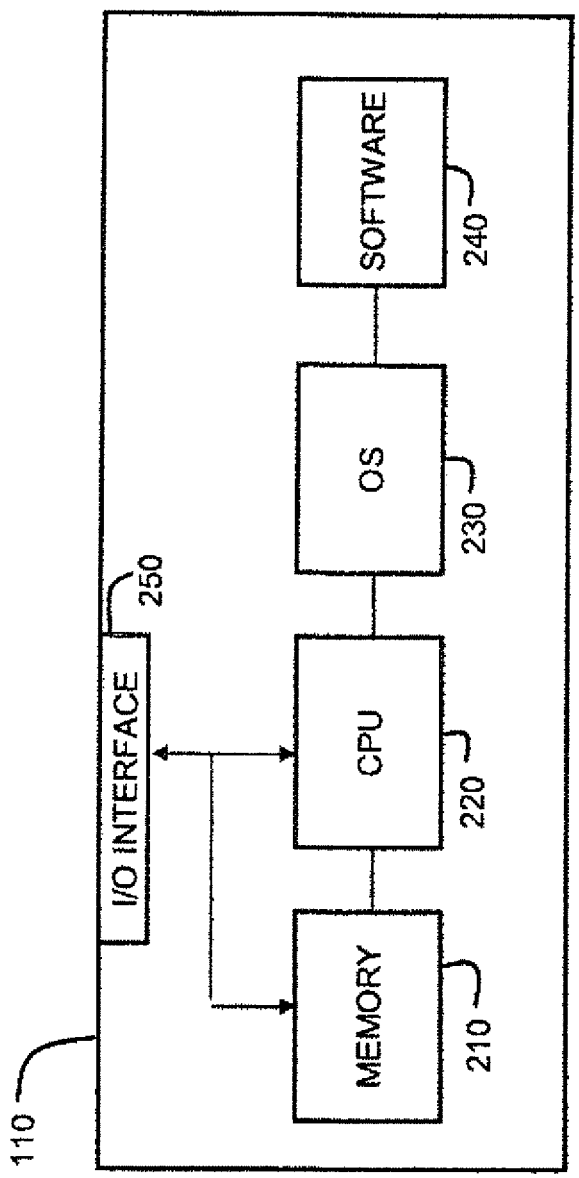
FIG. 2 is a functional block diagram of a managing computer system for a payment card service provider in accordance with an exemplary embodiment of the present disclosure.

The managing computer system 110 for the payment card service provider 112 as shown in FIG. 2 includes at least one memory device 210 configured to store data that associates identifying information of individual customers, merchants, and transactions associated with payment card accounts. System 110 further includes a computer processor 220, and an operating system (OS) 230, which manages the computer hardware and provides common services for efficient execution of various logic circuitry including hardware, software and/or programs 240. The processor 220 (or CPU) carries out the instructions of a computer program, which operates and/or controls at least a portion of the functionality of the managing computer system 110. System 110 further includes device input/output interface 250 configured to receive and output network and transactions data and information to and/or from managing computer system 110 from and/or to peripheral devices and networks operatively coupled to the system. Such devices may include user 121 and/or merchant 120 terminals, including point of sale terminals, wireless networks and devices, mobile devices and client/server devices, and user interfaces communicatively coupled over one or more networks for interfacing with managing system 110. The I/O interface 250 may include a query interface configured to accept and parse user requests for information based on the payment card transactions data. In addition, the I/O interface may handle receipt of transactions data and perform transactions based processing in response to receipt of transactions data as a result of a particular purchase via a point of sale terminal, by way of non-limiting example only.

The at least one memory device 210 may be any form of data storage device including but not limited to electronic, magnetic, optical recording mechanisms, combinations thereof or any other form of memory device capable of storing data, which associates payment card transactions of a plurality of transaction acquirers and/or merchants. The computer processor or CPU 220 may be in the form of a stand-alone computer, a distributed computing system, a centralized computing system, a network server with communication modules and other processors, or nearly any other automated information processing system configured to receive data in the form of payment card transactions from transaction acquirers or merchants 122. The managing computer system 110 may be embodied as a data warehouse or repository for the bulk payment card transaction data of multiple customers and merchants. In addition, the computer system 120 or another computer system 121 (e.g. user computer of FIG. 1) connected to computer system 110 (via a network such as network 130) may be configured to request or query the managing computer system 110 in order to obtain and/or retrieve information relating to categories of customers, merchants, and services associated therewith, based on information provided via the computer system 120 or 121 and profiling of the transaction data contained in computer system 110 according to the particular query/request.

Figure 3:
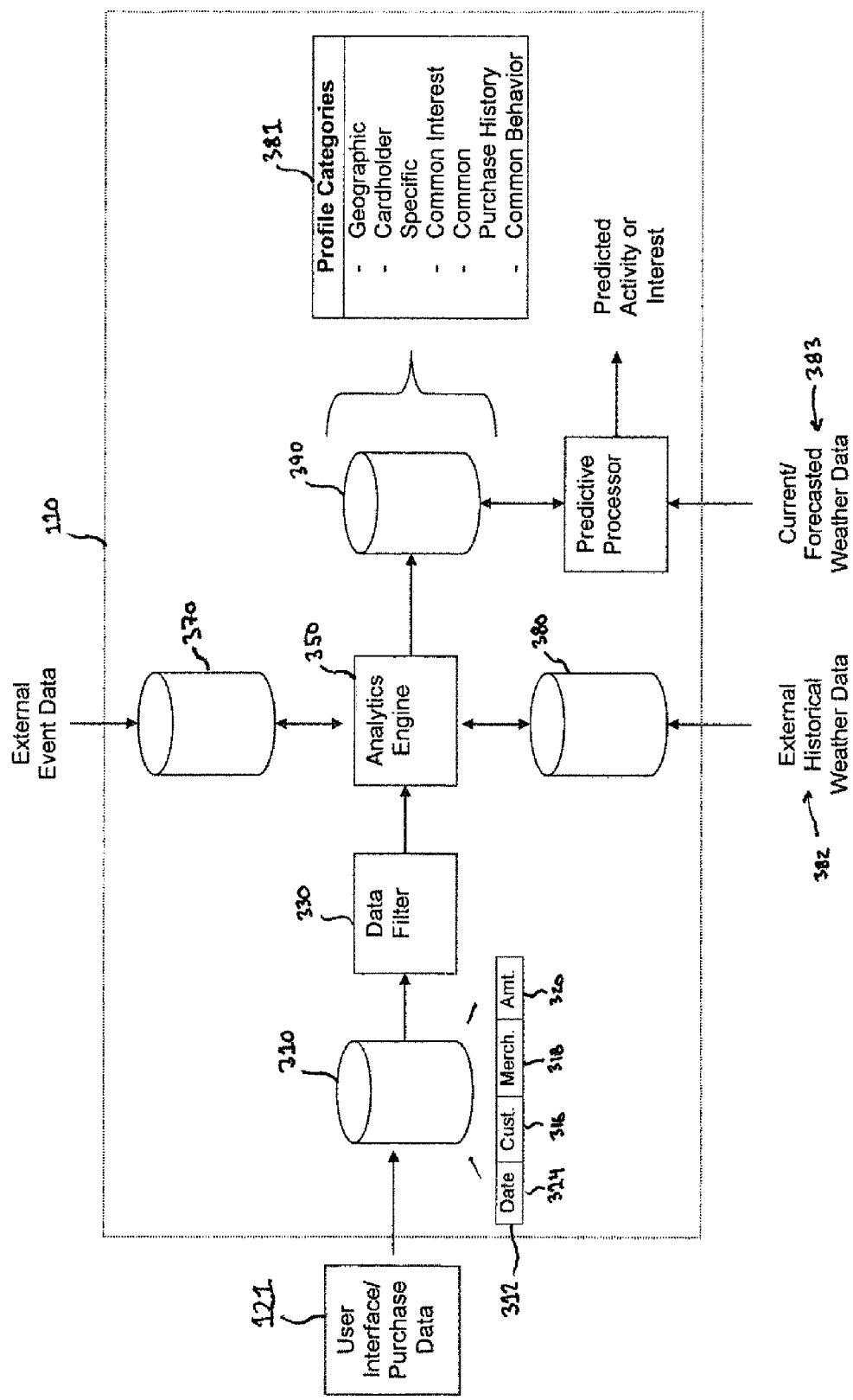
FIG. 3 illustrates a system for providing activity recommendations to individuals based on current or predicted weather conditions according to an embodiment of the present disclosure.
Figure 4:
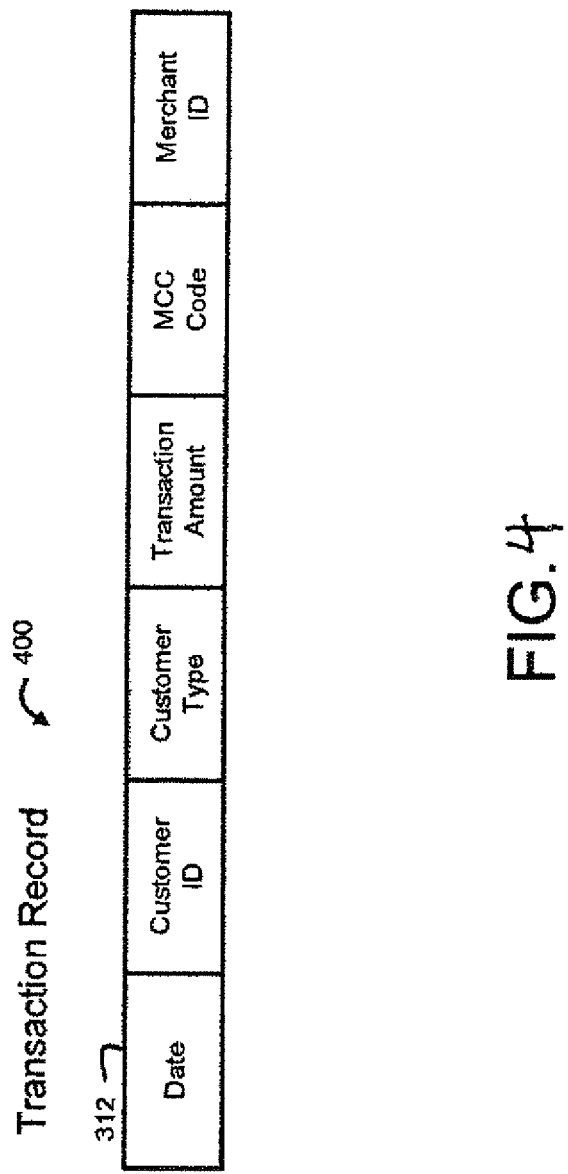
FIG. 4 illustrates exemplary transaction record data useful in implementing aspects of the present system and method.

Referring now to FIG. 3, there is shown a system block diagram and operational flow for identifying behavioral trends that correlate to weather conditions using cardholder transaction data and weather data according to an embodiment of the disclosure. A database 310 containing a multiplicity of transaction data is included in managing computer system 110 (FIGS. 1 and 2). Payment card transaction records 312 may be obtained via various transaction mechanisms, such as credit and debit card transactions between customers and merchants originating via a cardholder terminal or computer 121 (e.g. a personal computer). Payment card transaction records 312 may include transaction date 314 as well as customer information 316, merchant information 318 and transaction amount 320. Customer information 316 may further include customer account identifier (ID) and customer type, as provided in an exemplary transaction record illustrated in FIG. 4. This information may originate from, for example, passive means, such as ISO 8583 information from all payment card purchases. Additional information regarding the details of a cardholder's transaction history may be provided to the card network by, for example, clearing addenda received after purchases have been completed, and may further populate database 310.

As described above, embodiments of the present disclosure may be used to identify cardholder transactions associated with any predetermined type of good or service, such as those associated with leisure activities. In order to identify cardholders and the associated transactions of interest, payment card transaction data stored in database 310 may be subject to a filtering operation 330 according to the requirements of a particular application in order to selectively identify specific merchants and/or industries from a list of merchants or industries for targeted analysis. By way of non-limiting example only, the transaction data may be filtered by a computer processor according to different rules or targeting criteria, such as merchant type (e.g. entertainment service providers such as motion picture theatres, bowling alleys, tourist attractions/exhibits, commercial sports, etc.), for targeted analysis. In other embodiments, filtering may be aimed at other forms of data, such as merchant ID numbers, card network codes, transaction dates, transaction type codes, user-provided information, and the like. Further filtering (e.g. by geographical location such as region, state, county, city, zip code, and/or street) may be applied to further target particular aspects of the transaction data for given applications. While, in one embodiment, leisure activities may be the subject of transaction data filtering, it should be understood that transaction data filtering may be used to identify any type of transaction, including those for any type of good and/or service. Furthermore, it is to be understood that implementation of the present disclosure is performed without obtaining personally identifiable (private) data such that the results are not personalized. This enables maintaining privacy of a given user's identity unless the user opts-in to making such data available. In some implementations, the user data is anonymized to obscure the user's identify. For example, received information (e.g. user interactions, location, device or user identifiers) can be aggregated or removed/obscured (e.g., replaced with random identifier) so that individually identifying information is anonymized while still maintaining the attributes or characteristics associated with particular information and enabling analysis of said information. Additionally, users can opt-in or opt-out of making data for images associated with the user available to the system.

Filtered transaction data relating to leisure activity expenditures is provided to one or more processors, embodied in the illustrated system as analytics engine 350, for further refinement. Analytics engine 350 is configured to profile and categorize the filtered transactions with contemporaneous weather conditions according to logical relationships. In this way, analytics engine 350 is configured to generate correlations between leisure or entertainment transactions and the weather conditions present at or around the time of the transaction. Correlated data may be associated with any identifiable characteristic, such as cardholder information (e.g. cardholder identity, geographical information, etc.).

In order to generate these correlations, analytics engine 350 may be responsive to historic weather data and aggregate numbers of transactions accumulated over a given time period. Accordingly, a system according to an embodiment of the present disclosure may comprise an integrated weather feed, which may take the form of a historical weather database 380 for storing information such as temperature, solarity, precipitation type and the like for at least the times and locations which correspond to the cardholder transactions identified by analytics engine 350. In one embodiment, weather database 380 may comprise a continuously updating, comprehensive historical database of global weather data. In another embodiment, weather database 380 may be selectively populated with only weather data relevant to identified cardholder transactions. In this embodiment, a processor may be configured to query an external historical weather source 382 for weather data associated with a time and location corresponding to a particular transaction analyzed by engine 350. The predetermined weather data source 382 may comprise, for example, the National Weather Service, U.S. Oceanographic Service, or other suitable, reliable historic weather provider or combinations thereof.

Likewise, data and other information regarding leisure activities, which may include listings of sporting events, attractions (museums, restaurants, etc.), including any associated relevant data (e.g. dates and locations), may be imported via an outside database, and stored in an internal activities database 370. In addition to external information sources, activities and events, including location, date and other relevant details, may be identified by analytics engine 350 through the analysis of cardholder transactions, and stored in event database 370 for later reference. In this way, analytics engine 350 may be configured to build a database of known activities or events according to information obtained from cardholder transactions.

In a first embodiment, identified card payment transactions related to activities may be correlated with a particular weather condition, thus creating a direct correlation between a particular cardholder and their preferred activities in the presence of a given weather condition. However, identified activity transactions and weather may be correlated according to a number of factors or profile categories 381 beyond the identification of a particular cardholder's behavioral trends (e.g. a correlation based on cardholder ID alone). For example, correlations may be identified which relate to numerous geographical considerations, such as the location of the transaction or the residence of the cardholder. Data may also be correlated according to identified common interests. That is, for a given weather condition, an identifiable behavioral trend among many cardholders may indicate an inclination for cardholders to pursue a particular leisure activity. For example, in the event of snowy weather, an entire subset of cardholders may present a proclivity for skiing or snow-sport activities. Correlations according to these additional profile categories may also be stored.

Analytics engine 350 is configured to generate the above-described correlations between activities pursued by an individual identified cardholder, or one or more cardholders fitting a particular profile category, and an identified weather condition, and store these correlations and associations in a behavioral database 390. By way of non-limiting example only, analytics engine 350 may identify a trend between rainy weather conditions and the purchase of museum or movie tickets. This trend may be stored in behavioral database 390 as it relates to an individual cardholder, or particular group of cardholders, exhibiting the identified trend. Transaction database 310 may be continuously monitored by analytics engine 350 in order to provide regular updates to behavioral database 390.

Analytics engine 350 may further refine identified behavioral trends by searching for and identifying additional or secondary correlating factors (additional profile categories) within the data. By way of further non-limiting example, an initial correlation may be made indicating that cardholders affected by rain may be more likely to visit destinations such as a movie theater or a museum. A secondary correlation process may include, for example, recognizing that cardholders who had previously purchased tickets to an event (e.g. a baseball game) that was subject to cancellation on that day due to a weather event (e.g. rain event) are more likely (e.g. than an average consumer) to buy admission to a museum or movie theater on the day of the cancellation. Thus, this further correlation may identify a subset of cardholders (e.g. cardholders who have purchased event tickets) who are more likely to seek out alternate activities in the case of a cancellation of the event due to weather. These types of secondary relationships, or other shared profile characteristics between cardholders, may also be stored within behavioral database 390. The analytics engine may be configured to perform statistical analysis of the transaction data which includes independent variable analysis purchase sequencing, segmentation, clustering, ranking, and parameter modeling, to establish profiles, trends and other attributes and relationships that link merchants, customers, events and transaction amounts and weather events (e.g. rain, snow, temperature, percent cloud cover, wind speed, wind chill, etc.) to various purchases. For example, the analysis engine operates on the transactions records and weather data to cluster or group certain sets of objects (information contained in the data records) whereby objects in the same group (called a cluster) express a degree of similarity or affinity to each other over those in other groups (clusters).

Various types of models and applications may be configured and utilized by analytics engine 350 in order to derive information from the transaction data. Generally speaking, an analytics engine utilizing statistical analyses and techniques applied to the payment card transaction data may be implemented to analyze the payment card transactions records to determine relationships, patterns, and trends between and among the various transaction records. Such statistical analyses may be targeted to particular subsets of the transactions data, including by way of non-limiting example, one or more particular geographic regions, business categories, customer categories, product or service types, and purchasing frequencies. The transaction records may be processed and segmented into various categories in order to determine purchasers of a given type of product or service, such as those relating to leisure activities, by way of non-limiting example. The analysis engine may utilize independent variables as well as dependent variables representative of one or more purchasing events, customer types or profiles, merchant types or profiles, purchase amounts, and purchasing frequencies, by way of example only. The analysis engine may use models such as regression analysis, correlation, analysis of variances, time series analysis, determination of frequency distributions, segmentation and clustering applied to the transactions data in order to determine and predict the effect particular categories of data have on other categories.

Once behavioral database 390 has been established, it may be used to predict cardholder interests as they relate to weather conditions. Accordingly, by considering current or forecasted weather data, targeted activity recommendations or advertisements may be made to a particular cardholder, or one or multiple groups of cardholders, based on the stored correlations in behavioral database 390.

According to one embodiment of the present disclosure, a predictive processor 395 may be provided and embodied as one or more processors for predicting behavioral tendencies of cardholders according to current or forecasted weather conditions. Predictive processor 395 is responsive to current or forecasted weather data 383, which may be imported from the same sources set forth above with respect to historical weather data 382. Using this weather data, predicative processor 395 may be tasked (e.g. by a request input to the system) with identifying activities which may appeal to cardholders residing in a particular geographic area given current or predicted weather conditions. In addition to identifying activities, predictive processor 395 may identify individual cardholders, or groups of cardholders, who have shown an interest in the identified activity under the given weather conditions. For example, predictive processor 395 may be tasked with identifying cardholders residing in a specific area code. Likewise, current weather conditions may be analyzed for the targeted area code, and any trends between cardholder activities and the current weather may be identified. Using this data, identified cardholders, or other individuals known to reside in the same or proximate location to the identified cardholders, may be targeted for activity recommendations. This targeting may take the form of various media sources, for example, electronic advertisements via phone, text message, email, television and the like. Using the example of a canceled sporting event, upon notification of the cancellation of the event (e.g. through event database 370 or other external data source), cardholders known to be in attendance (or known to have purchased tickets to the event) may be targeted for advertisements corresponding to alternate activities, such as activities previously identified by analytics engine 350 and associated with the identified cardholders.

It should be understood that systems and methods according to the present embodiments may include generating recommendations according to stored trends, or merely providing the stored correlations to third parties, who may use the data to generate targeted advertisements or recommendations.

Each or any combination of the modules and components shown in FIG. 3 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 3, these modules may perform functionality described later herein.

Figure 5:
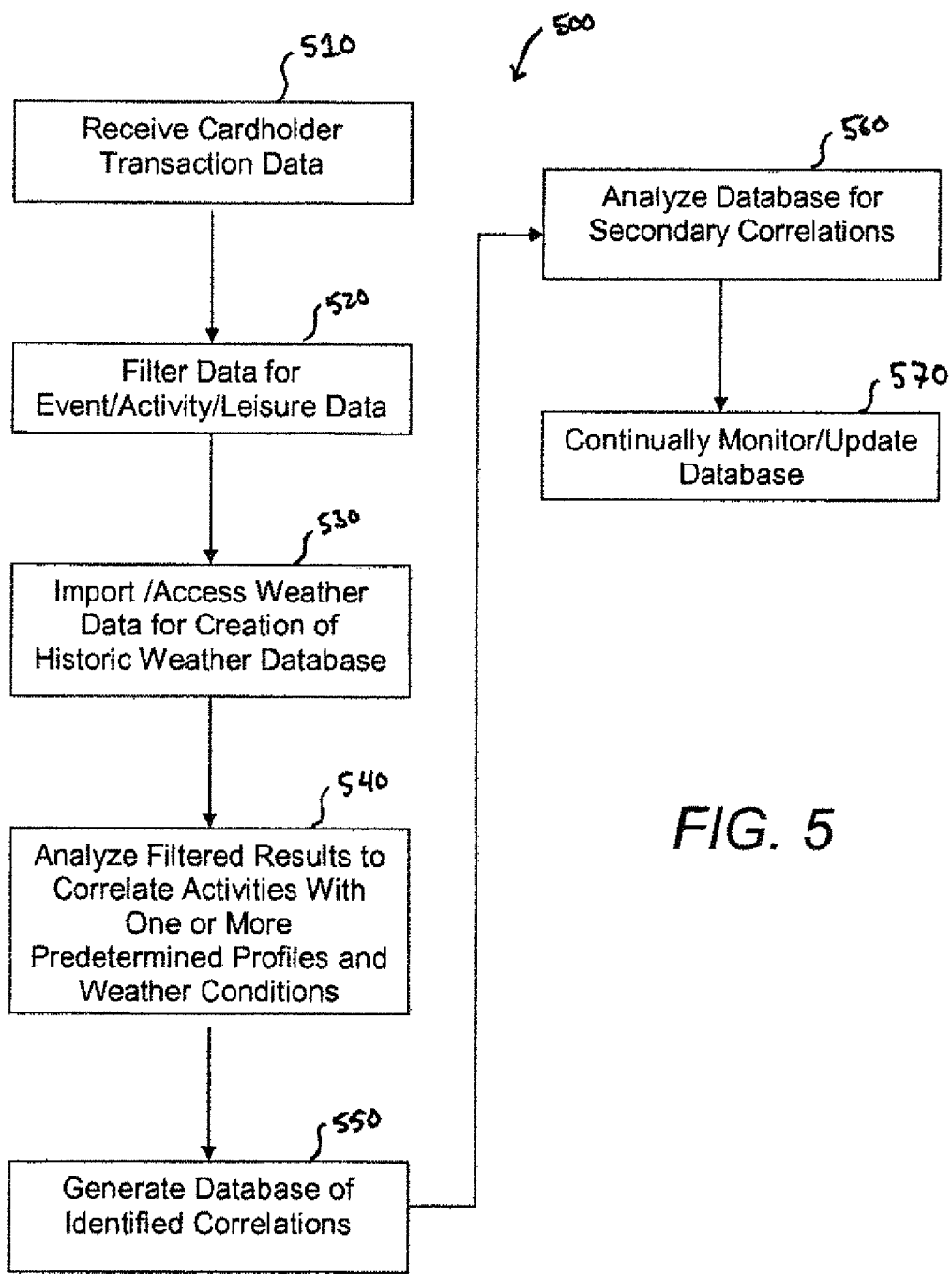
FIG. 5 illustrates an exemplary process flow for generating a behavioral database for storing correlations between characteristics of cardholder transactions and weather conditions according to an embodiment of the present disclosure.

FIG. 5 illustrates an exemplary process flow for generating behavioral database 390 of FIG. 3. More specifically, process 500 includes receiving general cardholder transaction data (block 510). As set forth above with respect to FIG. 3, data may be obtained through active or passive means, and stored on, for example a card network database. As this data may include all cardholder transactions, it may be filtered (block 520) by any number of characteristics as described above, in order to identify transactions relating to, by way of non-limiting example only, leisure activities. In block 530, historic weather data corresponding to at least the time and location of activities identified may be imported from a third party provider in block 520.

In block 540, an analysis of the filtered data is performed in an attempt to correlate activity-based transactions with one or more profile categories (e.g. cardholder ID, geographic considerations, etc.) and weather conditions around the time of the transactions or identified activities. Each of these identified correlations may be stored in a behavioral database in block 550. As described above, initial correlations may be further analyzed in an attempt to identify so-called secondary correlations for further refinement of the behavior data (block 560). In block 570, the database may be continually monitored and updated with additional identified behavioral trends.

Figure 6:
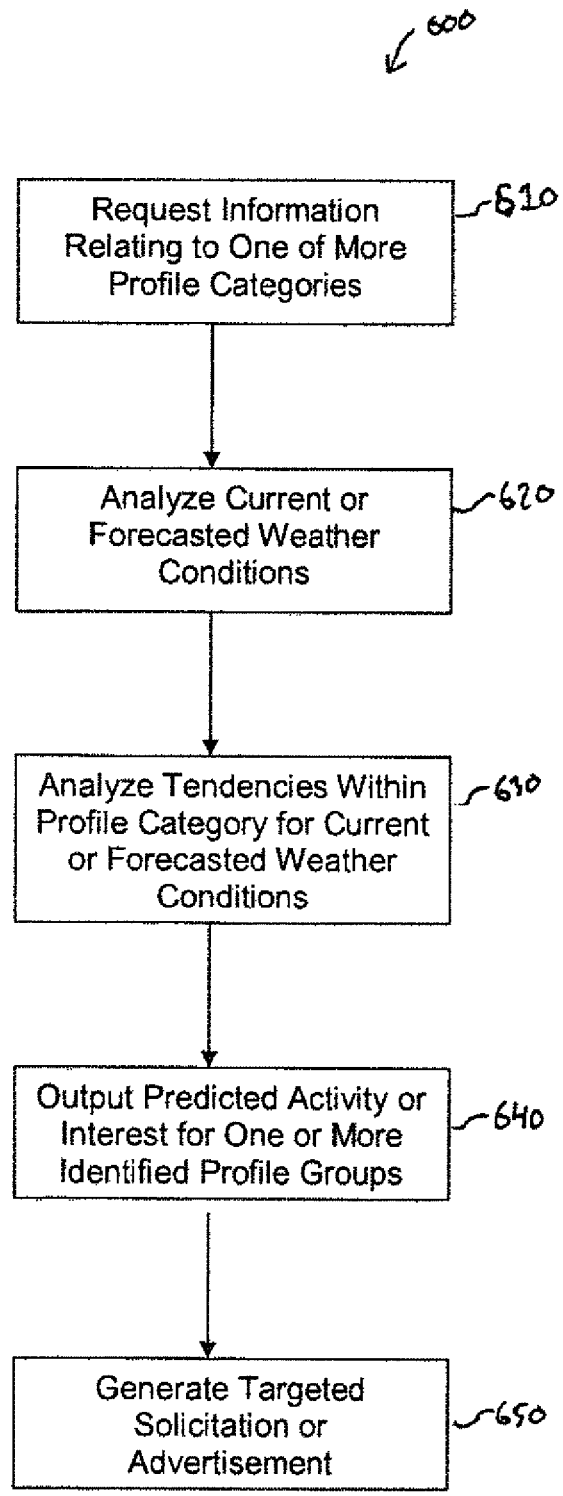
FIG. 6 illustrates another exemplary process flow for generating targeted activity recommendations according to current or predicted weather according to an embodiment of the present disclosure.

FIG. 6 illustrates another exemplary process flow for generating targeted solicitations or targeted recommendations according to present or predicted weather conditions. Process 600 includes the input of a request for data relating to a particular cardholder group or cardholders possessing a certain profile characteristic (e.g. present location, location of residence, identified hobby, etc.) in block 610. An analysis of current or predicted weather for a related geographic area is made in block 620. Block 630 comprises an analysis step, wherein trends or activity tendencies for one or more profile categories in the given current or predicted weather conditions are identified (e.g. identified within the behavioral database). In block 640, the output of this analysis may comprise, for example, a list of one or more cardholders meeting the desired profile characteristics, as well as the activities known to correlate with the current or forecasted weather for the one or more cardholders. This output may be used to generate targeted solicitations or activity recommendations to a particular group of cardholders (block 650).

The flow charts described herein do not imply a fixed order to the steps, and embodiments of the present invention may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by a processor result in performance according to any of the embodiments described herein. In embodiments, each of the steps of the methods may be performed by a single computer processor or CPU, or performance of the steps may be distributed among two or more computer processors or CPU's of two or more computer systems. In embodiments, one or more steps of a method may be performed manually, and/or manual verification, modification or review of a result of one or more processor-performed steps may be required in processing of a method.

The embodiments described herein are solely for the purpose of illustration. Those in the art will recognize that other embodiments may be practiced with modifications and alterations limited only by the claims.

The invention claimed is:

1. A system for identifying correlations between customer payment card purchases and weather conditions, the system comprising:
 one or more data storage devices containing payment card transaction data of a plurality of customers, the payment card transaction data including at least customer information, geographical information and information identifying a category of good or service associated with the transaction;
 one or more data storage devices containing historic weather data;
 one or more processors;
 a memory in communication with the one or more processors and storing program instructions, the one or more processors operative with the program instructions to:
  identify correlations between payment card transactions and weather conditions contemporaneous to said transactions,
  generate a behavioral database of activities or events, each associated with at least one of said weather conditions, and with one or more of said customers fitting a particular profile category, and based on said identified correlations between said payment card transactions and said weather conditions;
  generate, from said behavioral database, a list of one or more activities or events predicted for subsequent purchase by a given consumer for one or more profile categories, based on an identified current or forecasted weather condition in a predetermined area, in which the given consumer is located or predicted to be located.

2. The system of claim 1, wherein the at least one profile category includes at least one of customer identification and geographical information.

3. The system of claim 1, wherein the one or more activities or events for subsequent purchase include at least one of a sports event, a museum event, and a theatrical event.

4. The system of claim 1, wherein the one or more processors is responsive to a source of current or forecasted weather data for identifying said current or forecasted weather conditions in a predetermined area to generate said list of one or more activities or events predicted for subsequent purchase.

5. The system of claim 4, wherein the one or more processors is further configured to predict said one or more activities for subsequent purchase for one or more profile categories based on the identified current or forecasted weather conditions in the predetermined area.

6. A computer-implemented method for identifying correlations between customer payment card purchases and weather conditions, the method comprising:
 generating a database identifying payment card transactions based on processing payment card transaction data of a plurality customers and merchants, the payment card transaction data including at least customer information, geographical information and information identifying a category of good or service associated with the transaction;
 generating a database comprising historical weather data corresponding to the time and location of the identified payment card transactions;
 determining, by a processor, correlations between said payment card transactions and weather conditions contemporaneous to said transactions,
 generating weather condition specific behavioral purchase profiles for one or more customers fitting a particular profile category based on said correlations; and
 predicting one or more activities or events for subsequent purchase by a given consumer for one or more of said weather condition specific behavioral purchase profiles, based on an identified current or forecasted weather condition in a predetermined area, in which the given consumer is located or predicted to be located.

7. The method of claim 6, wherein the at least one profile category includes at least one of customer identification and geographical information.

8. The method of claim 6, further comprising the step of identifying payment card transactions relating to said one or more activities or events.

9. The method of claim 6, wherein the one or more processors is responsive to a source of current or forecasted weather data for identifying said current or forecasted weather conditions in a predetermined area.

10. A system for generating targeted advertisements for leisure expenditures according to current or forecasted weather conditions, the system comprising:
 one or more data storage devices containing payment card transaction data of a plurality of customers, the payment card transaction data including at least customer information, geographical information and information identifying a category of good or service associated with the transaction;

a source of historic weather data;

a source of current or forecasted weather data;

one or more processors;

a memory in communication with the one or more processors and storing program instructions, the one or more processors operative with the program instructions to:

identify payment card transactions relating to leisure expenditures;

identify correlations between the identified payment card transactions related to leisure expenditures and weather conditions contemporaneous to said transactions;

generate a behavioral database of leisure activities or events, each associated with at least one of said weather conditions and with one or more of said customers fitting a particular profile category, and based on said identified correlations between said payment card transactions and said weather conditions;

generate, from said behavioral database, a list of one or more leisure activities or events predicted for subsequent purchase by a given consumer for one or more profile categories, based on an identified current or forecasted weather condition in a predetermined area, in which the given consumer is located or predicted to be located; and generate an advertisement for said one or more predicted leisure activity or event expenditures.

11. The system of claim 10, wherein the at least one profile category includes at least one of customer identification and geographical information.

* * * * *